J. B. HADAWAY AND C. E. CAMPBELL.
AERIAL BOMB.
APPLICATION FILED DEC. 14, 1918.

1,383,106.

Patented June 28, 1921.
6 SHEETS—SHEET 1.

INVENTORS:
John B. Hadaway
Charles E. Campbell
by Fred W. Suibord Atty

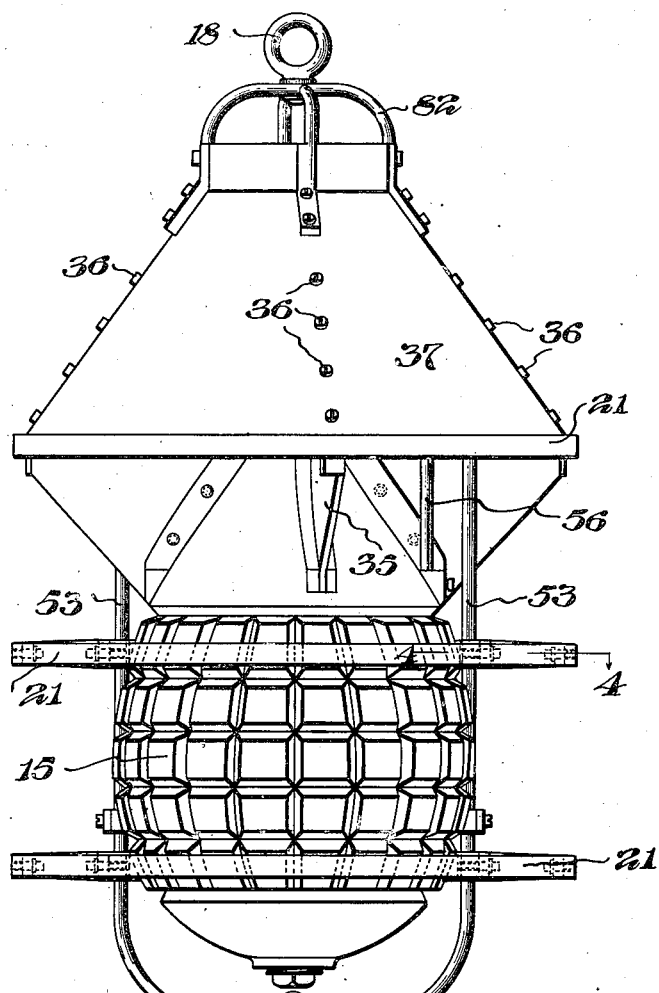
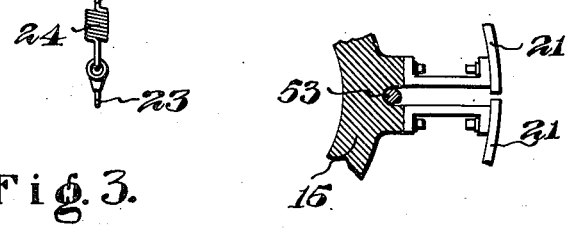

J. B. HADAWAY AND C. E. CAMPBELL.
AERIAL BOMB.
APPLICATION FILED DEC. 14, 1918.

1,383,106.

Patented June 28, 1921.

INVENTORS:
John B. Hadaway
Charles E. Campbell
by Fred W. Guibord atty

J. B. HADAWAY AND C. E. CAMPBELL.
AERIAL BOMB.
APPLICATION FILED DEC. 14, 1918.

1,383,106.

Patented June 28, 1921.
6 SHEETS—SHEET 4.

INVENTORS:
John B. Hadaway
Charles E. Campbell
by Fred Lombard
Att'y

J. B. HADAWAY AND C. E. CAMPBELL.
AERIAL BOMB.
APPLICATION FILED DEC. 14, 1918.

1,383,106.

Patented June 28, 1921.

INVENTORS:
John B. Hadaway
Charles E. Campbell
by Fred W Lombard
att'y

J. B. HADAWAY AND C. E. CAMPBELL.
AERIAL BOMB.
APPLICATION FILED DEC. 14, 1918.

1,383,106.

Patented June 28, 1921.
6 SHEETS—SHEET 6.

INVENTORS:
John B. Hadaway
Charles E. Campbell
by Fred W. Girard
Att'y

UNITED STATES PATENT OFFICE.

JOHN B. HADAWAY, OF SWAMPSCOTT, AND CHARLES E. CAMPBELL, OF LYNN, MASSACHUSETTS.

AERIAL BOMB.

1,383,106.  Specification of Letters Patent.  Patented June 28, 1921.

Application filed December 14, 1918. Serial No. 266,763.

*To all whom it may concern:*

Be it known that we, JOHN B. HADAWAY and CHARLES E. CAMPBELL, citizens of the United States, residing at Swampscott and Lynn, respectively, in the county of Essex and State of Massachusetts, have invented certain Improvements in Aerial Bombs, of which the following description, in connection with the accompanying drawings, is a specification, like reference characters on the drawings indicating like parts in the several figures.

This invention relates to explosive missiles and is herein illustrated as embodied in an aerial bomb.

Hitherto bombs have been exploded by percussion or by various time fuses the latter acting to explode the bomb at the end of a predetermined interval of time dependent upon the distance to be traveled by the bomb and the rate at which it traveled. One object of the present invention is to cause the bomb to explode at a predetermined distance from the target toward which it is moving irrespective of the time of its flight or the distance which it has traveled. For example, if the mechanism for exploding a bomb in accordance with the present invention is set to become operative when the bomb has reached a distance of say twenty feet from the earth it will be entirely immaterial whether the bomb is dropped from a height of one thousand feet or five thousand feet. In either case the exploding mechanism will only become operative when the bomb reaches the prescribed distance from its target.

Another object of the invention is to provide a bomb with an electric ignition the current for which is generated by the movement of the bomb through the air. The extreme safety of such a construction is obvious, since percussion has no effect upon it and the bomb may therefore be handled roughly with perfect safety.

Other objects of the invention relate to means for varying the predetermined distance from its target at which the bomb shall explode, to improved means for releasing the bomb, and to various other features including certain details of construction and combinations of parts which will be described as embodied in an illustrative device and pointed out in the appended claims.

Referring now to the accompanying drawings,—

Fig. 3 is an elevation of the bomb without the weight;

Fig. 4 is a fragmentary section on the line 4—4 of Fig. 3;

Figure 1:
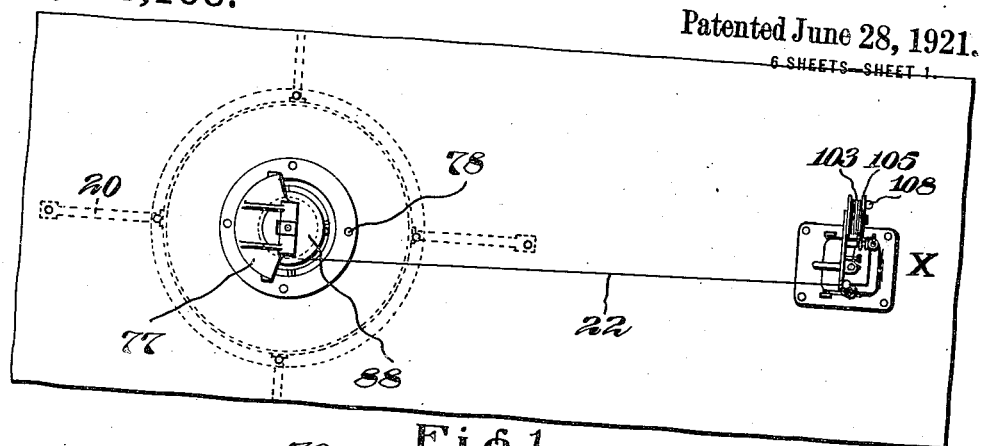
Figure 1 is a plan view of a portion of the floor of an aeroplane showing the bomb and the weight in position to be released.
Figure 2:
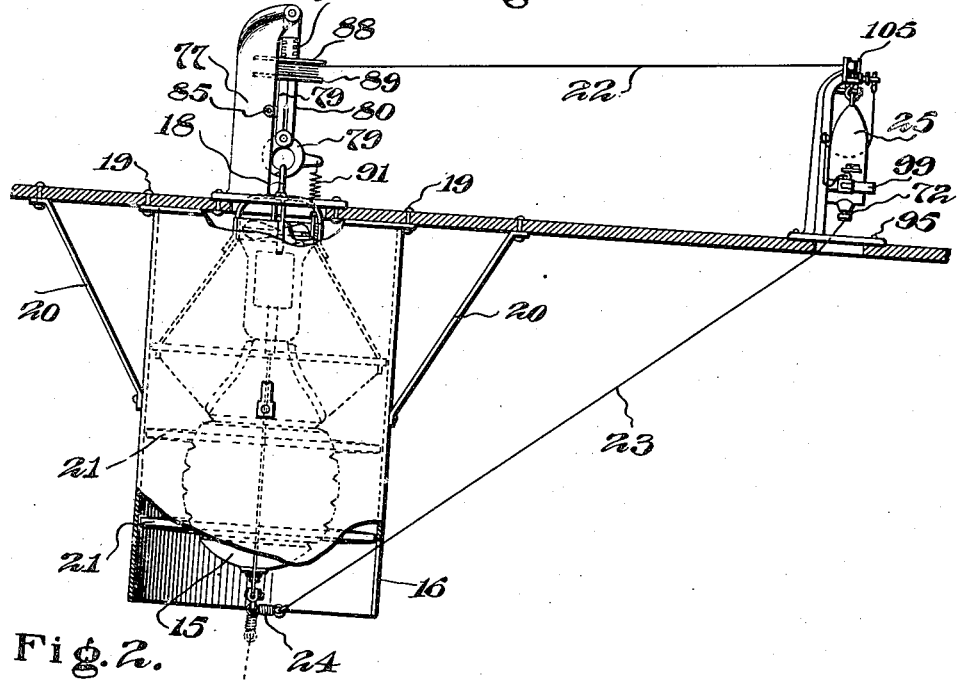
Fig. 2 is an elevation, partly in section, showing the same parts.

Referring first to Figs. 1 and 2, the bomb 15 is normally located in an open-ended cylinder 16, being suspended by tongs 79, 80 which engage an eye 18 on the top of the bomb. The cylinder 16 is firmly held in place by rivets 19 and braces 20; and the bomb is provided with rings 21 which fit loosely in the cylinder to prevent the bomb from swaying and serve to permit the bomb to be rolled around preparatory to mounting it in the position shown since the bomb may be made in sizes which weigh several hundred pounds. These rings are each made in two parts as shown in Fig. 4. The bomb is released by pulling a cord 22 in a manner presently to be described. Attached to the lower end of the bomb by another cord 23 and a spring 24 is a weight 25 which is lowered approximately into the position shown in dotted lines before the bomb is released, the weight serving to exert a pull through the cord 23, as will presently be described, to prevent the bomb from exploding during its fall until the desired moment which occurs when the falling movement of the weight is retarded or arrested. The effective length of the cord 23 thus determines the distance at which the bomb will explode above the target, the word "target" being herein used to designate the earth, sea, ship, building, etc. which arrests the falling weight or retards it sufficiently to produce slack in the cord 23. With this brief general description of the manner in which the apparatus is manipulated, a detailed description of its parts will now be given.

Figure 5:
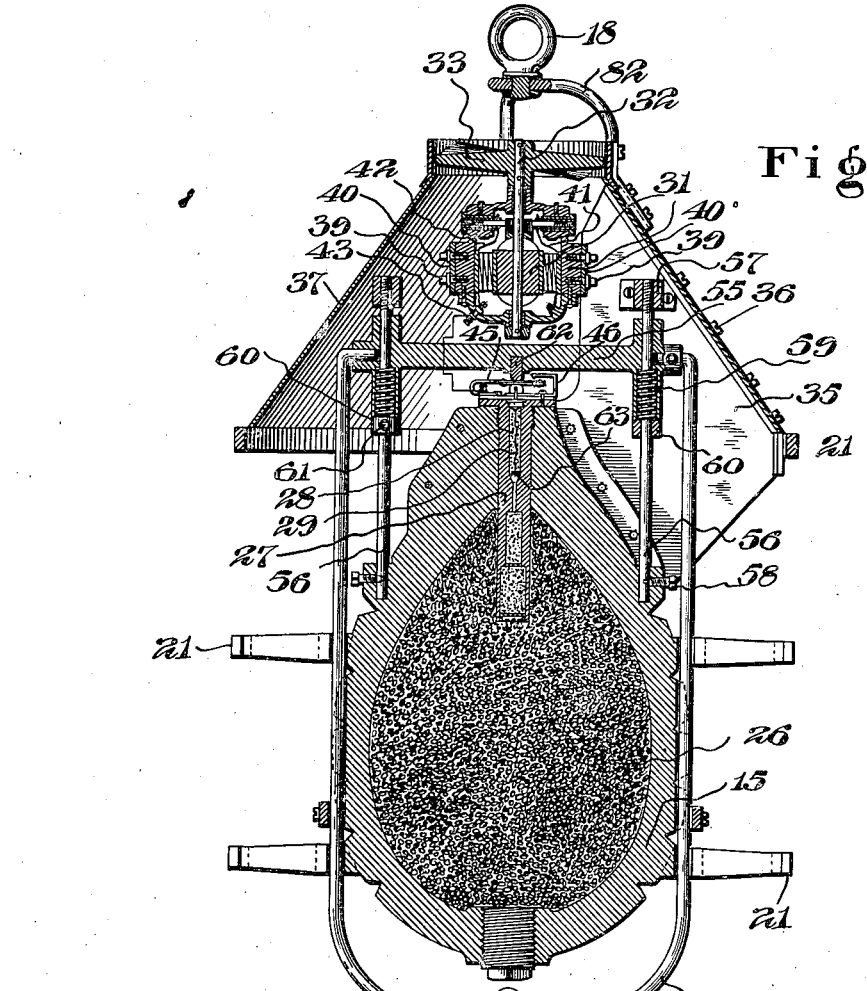
Fig. 5 is a vertical longitudinal section of the bomb, showing the parts in the positions which they occupy while the weight is exerting a downward pull on the cord 23.
Figure 6:
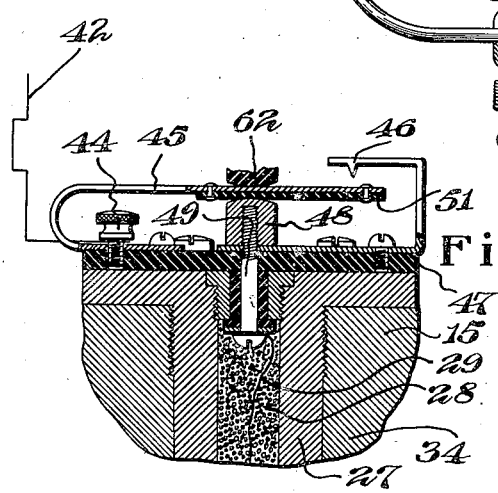
Fig. 6 is an enlarged sectional view of a portion of the bomb.

The bomb and all the appurtenances which accompany it in its fall except the weight 25 is shown in elevation and in section in Figs. 3, 5 and 6. In these figures the parts are in the position which they occupy during the fall of the bomb while the weight is exerting its downward pull on the cord 23. The illustrative bomb is substantially pear-shaped and is scored on its outside in the usual manner to insure that it shall break into pieces of the desired size. It may be filled with high explosive such as T. N. T. 26 or with shrapnel as may be desired into which extends a detonator 27 which may be of any approved construction. In order to ignite the first powder charge 28 of the detonator, a small wire 29 of platinum or other suitable material extends through said powder charge and is heated at the proper time by a current of electricity which is caused to flow through it. The source of electric energy is a small generator 31 to the upper end of the shaft 32 of the armature of which is fast a propeller 33. Spaced equally about the upper portion of the bomb, and fast to it are vertical vanes 35 the upper outer edges of which have fastened to them by screws 36 an inverted funnel 37 in the smaller end of which the propeller is located, the casing of the generator 31 being fastened by screw bolts 39 to flanges 40 formed on the vanes 35. The purpose of the funnel is two-fold, first to concentrate a strong draft of air on the propeller to turn it and second to retard the fall of the bomb so that it will tend to lag behind the falling weight and thereby maintain the cord or filament 23 taut. The purpose of the vanes is to prevent the whole structure from turning, an effect which would result more or less from the action of the propeller if the vanes were not present. One terminal of the generator is grounded by its lead 41 on the bomb structure. The other lead 42 runs down to a terminal 43 which is connected at 44 with a resilient contact member 45, the free end of which tends always to rise into engagement with a rigid contact member 46, the two contact members being supported upon a piece of insulating material 47. An abutment 48, which is held upon the base of the contact member 46 by a screw 49 and insulated from the bomb structure as shown, limits the extent of downward movement of the resilient contact member 45, the underside of said last-named member carrying a piece of insulating material 51. The resilient contact member 45 is held down in the position shown through the action of the falling weight which is attached to the cord 23.

Figures 7, 8:
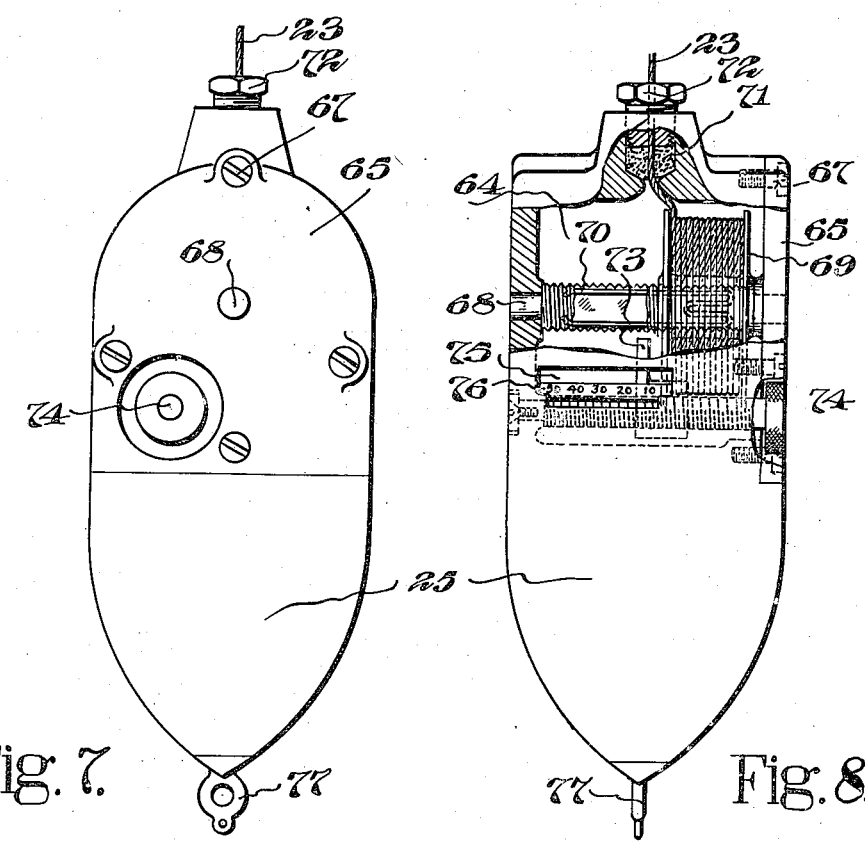
Fig. 7 is an elevation of the weight.
Fig. 8 is an elevation of the weight viewed at an angle of ninety degrees from the position shown in Fig. 7, part of the casing having been broken away.
Figure 9:
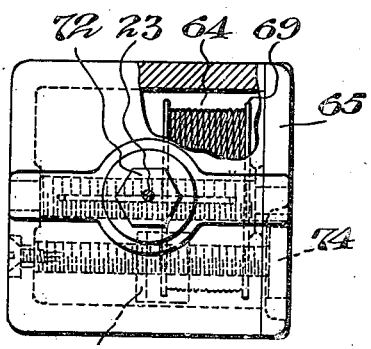
Fig. 9 is a plan of the weight, part of the top of the casing having been broken away.

For this purpose the end of the cord is attached to the spring 24 which is in turn attached to the lower end of a frame comprising a U-shaped member 53 and a cross-bar 55, said cross-bar being vertically slidable on upright rods 56 which are threaded at their upper ends into brackets 57 on the vanes 35 and at their lower ends are held in sockets in the bomb casing by pointed screw-bolts 58. The bores in the cross-bar 55 through which the rods 56 extend are enlarged at their lower portions to receive coiled springs 59 the lower ends of which rest upon collars 60 adjustably held in place on the rods 56 by screw-bolts 61. A small block 62 of insulating material is set into the cross-bar 55 near its center in position to engage the resilient contact member 45 at the proper time and hold it down against the insulated abutment 48. As long as the bomb and its weight are properly supported on the aeroplane, as shown in Figs. 1 and 2, and no downward pull is being exerted through the cord 23, the springs 59 hold the cross-bar in raised position, and the resilient member 45 is in contact with the rigid member 46; but as soon as the weight is released and hangs from the cord 23, the cross-bar is pulled down into the position shown in Figs. 5 and 6 to break the contact. The rigid member 46 is mounted on the insulating material 47 and is thereby insulated from everything except the screw 49 to the head of which the upper end of the wire 29 is attached. The lower end of this wire is grounded by being attached to a perforated disk 63 which is driven into the lower end of the upper chamber of the detonator casing. With this construction the generator runs idle as long as the contacts are separated but as soon as they come together a current flows through the fuse wire 29 to heat it to a temperature sufficient to ignite the powder charge 28. Referring now more particularly to Figs. 7, 8 and 9, the weight has in its upper portion a chamber 64 one wall of which is formed by a removable plate 65 held in place by screws 67. A stationary shaft 68 is threaded to fit a threaded bore in the hub of a reel 69 and is slotted to receive a light expansion spring 70 which engages the hub of the reel and acts to retard its turning. One end of the cord 23 is wound upon this reel; and from the reel the cord passes out through a rubber friction plug 71 and is attached, as has been described, to the spring 24. The plug acts as a drag to prevent the cord from being pulled out too quickly and is held in place in a socket in the upper part of the weight by a perforated nut 72, by turning which in one direction or the other the drag of the plug on the cord may be increased or decreased. When the weight is released from its support on the aeroplane and permitted to hang down from the bomb, the cord 23 will be paid out and the reel turned so as to move it bodily to the left as viewed in Fig. 8, and this paying out of the cord and bodily movement of the reel would continue if not arrested until the reel brought up against the left-hand wall of the chamber 64. If no further construction were employed, the weight would always be finally suspended a predetermined fixed distance below the bomb. In order to vary this predetermined distance, an adjustable stop 73 is provided which is slidable in a suitable guideway parallel to the shaft 68 and is threaded to receive an adjusting screw 74 the knurled head of which is accessible from the outside of the weight. By turning the screw, which is held from longitudinal movement, the stop may be set in any desired position to regulate the distance below the bomb which the weight will finally assume. In order to facilitate this adjustment, a slot 75 in one wall of the weight permits a view of the stop 73, and a scale 76 shows the distance in feet, meters, or other units at which the weight will be suspended below the bomb when the bodily movement of the reel along the shaft is arrested by the stop. An eye 77 furnishes means for suspending the weight on the aeroplane support.

Figure 11:
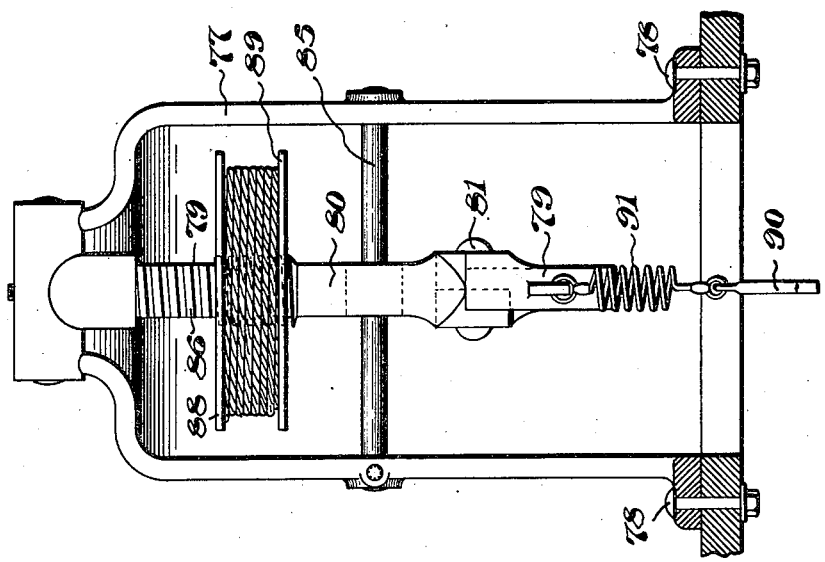
Fig. 11 is an elevation of the same mechanism viewed at an angle of ninety degrees from the position shown in Fig. 10.
Figure 10:
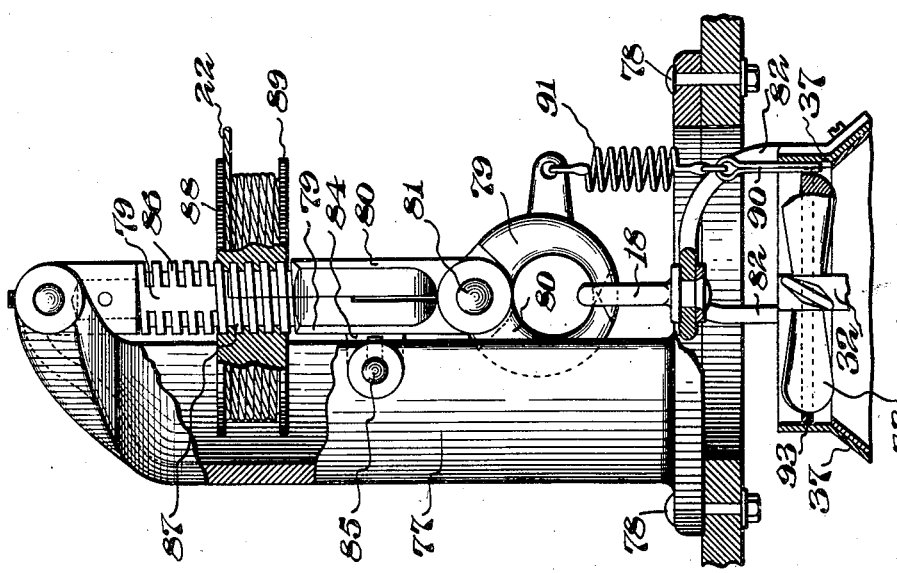
Fig. 10 is an elevation of the mechanism for supporting and releasing the bomb.

Referring now to Figs. 10 and 11, a bomb support 77 having in its base a circular opening which registers with a similar opening through the floor of the aeroplane is held in place by bolts 78. A pair of tongs having a stationary member 79 and a movable member 80, which are pivoted together at 81, are normally closed within the eye 18 the base of which is swiveled in a spider the lower ends of the arms 82 of which are fastened to the inverted funnel 37 on the bomb. The stationary member 79 is of reduced diameter at its upper end and is pinned in a socket in a T-shaped bracket which is integral with or rigidly fastened to the upper overhanging portion of the support 77. The stem of the stationary member 79 has full threads 86 on its upper portion and half threads 87. The stem of the movable member 80 has half threads 88 on its upper end which register with the half threads 87 when the member 80 is in the position shown. A reel 89 about which the cord 22 is wound has a bore threaded to receive the threads and complementary half threads, which have just been described, and serves, when in the position shown, to hold the jaws of the tongs firmly closed. A pull upon the cord 22, however, will cause the reel to move upwardly, and as soon as it has run up off the complementary half threads 87, 88, the tongs are free to open. The opening of the tongs is caused by the downward pull of the ring 18 due to the weight of the bomb, the overlapping ends of the jaws of the tongs being beveled as shown so that when the cord 22 is pulled to rotate the reel 89 sufficiently, the member 80 swings in a clockwise direction, and the ring slides off from the beveled end of the jaw 79. In order to lock the propeller 33 from movement until the bomb is released, a cotter-pin 90, suspended by a spring 91 from a lug formed on the stationary member 79 of the tongs, extends into a bore half of which is formed in a ring 93 carried by the propeller blades and the other half in the adjacent wall of the small end of the inverted funnel 37. The propeller is thus securely locked from turning as long as the bomb is carried by the aeroplane but is unlocked as soon as the bomb is released.

Figure 12:
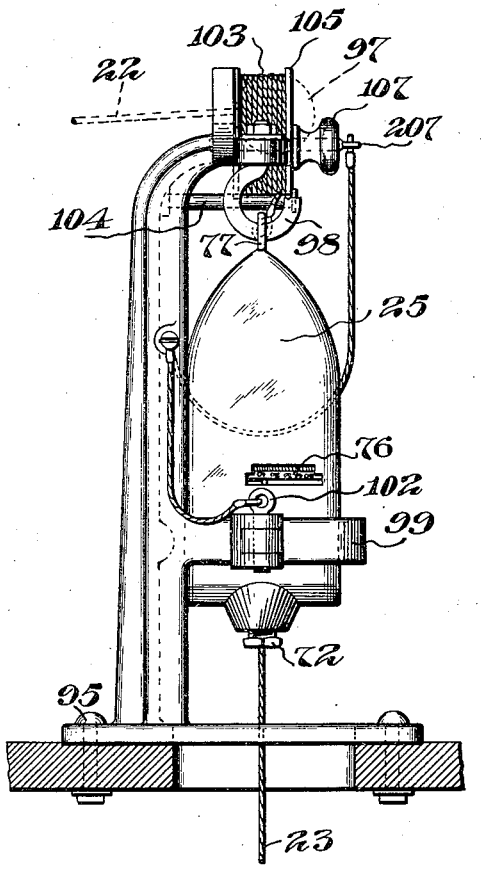
Fig. 12 is an elevation of the mechanism for supporting and releasing the weight.
Figure 13:
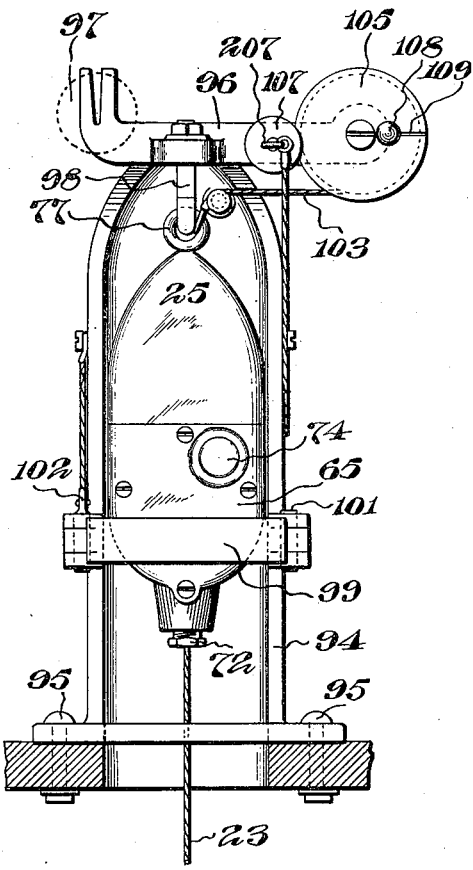
Fig. 13 is an elevation of the same mechanism viewed at an angle of ninety degrees from the position shown in Fig. 12.

The mechanism for supporting and for releasing the weight is shown in detail in Figs. 12 and 13. A standard 94, which is fastened in place by bolts 95, has an opening in its base which registers with a similar opening in the floor of the aeroplane. Formed integral with the upper overhanging end of the standard is a bar 96, one end of which is turned up and forked to receive the cord 22 to the end of which a ball 97 is attached. This ball serves as a handle which may be readily grasped when it is desired to pull the cord 22 to release the bomb. Near the middle of the bar 96 is a lug which supports a hook 98 upon which the weight is hung by means of the eye 77. A half-rectangular guard 99 hinged at 101 and locked in closed position by a cotter-pin 102 fits about part of the square end of the weight and in coöperation with the standard prevents the weight from swaying, but does not fit tightly enough to interfere with the disengagement of the eye 77 from the hook 98 or the subsequent downward movement of the weight.

The weight might be unhooked and permitted to fall preparatory to releasing the bomb, but such a procedure is not desirable because of the sudden strain which would be put upon the cord 23. Instead, means are provided for lowering the weight a considerable distance before releasing it. To permit this procedure a cord 103 which is attached at one end to the ring 77, runs up over a pin 104 carried by the standard 94 and is wound about a reel 105 which is rotatably mounted at one end of the bar 96. A handle 107 which is fast to a lug on one flange of the reel 105 is perforated to receive a pin 207 which passes through the perforation and into a socket in the bar 96 thereby preventing the reel from turning until the pin is removed. When the weight has been disengaged from the hook 98 and the pin 207 pulled out, the unwinding of the reel may be controlled by grasping the handle 107. The end of the cord 103 remote from the ring 77 is fast to a ball 108, the cord passing through a slot 109 in one flange of the reel. The locking pins 102 and 207 are attached to the support 94 by cords so as not to be lost when pulled out and dropped.

The bomber's seat is located approximately at the point marked X in Fig. 1 so that he faces the apparatus shown in Fig. 13 just as does the observer of the latter figure. When it is desired to drop the bomb, the weight is first released by pulling out the pin 207, lifting the weight to disengage the eye 77 from the hook 98 and then lowering the weight, using the handle 107 to regulate the turning of the reel 105. The weight is thus lowered slowly until the cord 103 is all paid out, the end of the cord finally being pulled out of the slot 109 and the ball 108 thereby freed. The weight then continues to descend with the cord 23 being paid out until the reel 69 inside the weight contacts with the adjustable stop 73. At this time the weight occupies some such position as that indicated in dotted lines in Fig. 2. All this procedure is preparatory to the dropping of the bomb and is carried out sometime before the aeroplane reaches the exact locality from which the bomb is to be dropped. The dropping of the bomb is accomplished by grasping the ball 97 and exerting a pull on the cord 22. The effect of this (see Fig. 10) is to rotate the reel 89 and unlock the movable member 80 of the tongs by which the bomb is suspended. As soon as this occurs, the downward pull of the ring 18 on the tapered ends of the tongs opens them, and the bomb falls, the locking cotter-pin 90 being thereupon pulled out and the propeller 33 freed. The inverted funnel retards the fall of the bomb. The weight, however, has no such retarding means and consequently exerts a steady pull on the cord 23 thereby maintaining the contact members 45, 46 separated. The funnel also acts to concentrate a current of air on the propeller to spin it; and the vanes 35 steady the bomb and prevent it from rotating. As long as the weight exerts its downward pull the generator runs idle, but as soon as the downward movement of the weight is arrested or retarded sufficiently to permit the springs 59 to raise the cross-bar 55, contact is made between the members 45 and 46, the fuse wire 29 is heated and the bomb explodes.

The bomb of the present invention would be particularly effective when used against masses of troops, the purpose being to shower them over a large area with a rain of missiles. By reference to Fig. 5 it will be noted that the casing of the bomb is thicker at the top and bottom than at the sides, the purpose of this construction being to throw the missiles (shrapnel or fragments of the bomb casing or both) outwardly so that the combined action of the explosive charge and gravity will be to throw them downwardly and outwardly in a spray or shower thereby spreading them thickly over a large area. The particular construction of the bomb casing may obviously be varied as for example by stays or bolts and by thickening the casing at different localities to control the direction in which the missiles will be thrown by the explosive charge. This construction taken with the capability of causing the bomb to explode at any desired distance above the earth permits an accurate control of shower of missiles so as to get from them the most effective result.

With regard to locating the explosion of the bomb at a predetermined distance from its target as has been described in the specification, it is, of course, obvious that the bomber should be provided with a chart based upon the velocity at which the bomb will be traveling when the exploding mechanism is rendered operative; but since this is a function of which the height of the aeroplane at the time the bomb is dropped is the principal variable, the preparation of such a chart presents no considerable difficulty.

As to safety in handling, the bomb of the present invention possesses this quality in the highest degree. Except when the bomb is traveling through the air there is no possibility of exploding it, since the exploding mechanism is perfectly inert.

As has been stated above, the detonator may be of any approved construction. With any detonator there is an interval of time between the heating of the wire 29 and the explosion of the bomb; and detonators having different intervals are in common use. In the explanation of the operation of the bomb which has been given above, it has been assumed, in order to promote brevity of description, that the effective length of filament, determined by the position in which the stop 73 was set, was sufficient to cause the bomb to explode above the target. It should be noted, however, that the bomb may readily be caused to explode after passing through a readily puncturable target such as the roof of a building. For example, let it be supposed that the target is the easily punctured roof of a hangar. In such a case by using a comparatively short length of filament the bomb may be caused to explode near the floor of the hangar, or by using a greater effective length the explosion may be caused to take place near the roof or by using a still greater length the explosion may be caused to take place above the roof. The last named result would probably never be desired, but the capability thus illustrated might be extremely useful in case the bomber started out to demolish a hangar and unexpectedly flew over a mass of troops.

In such case, by merely setting the stop to increase the effective length of the filament, the bomb could be made to explode over the heads of the troops. From a consideration of such possibilities as these it will be apparent that the construction by which the bomber may readily control the effective length of the filament is an exceedingly important feature of the invention. He is thus able to cause the bomb to explode at a predetermined point near the target or at a second predetermined point more distant from the target or at any intermediate point; and in the case of an easily punctured target, the first and second points may be located either both above, both below, or one above and the other below the target.

Having thus described our invention, what we claim as new and desire to secure by Letters Patent of the United States is:

1. The combination with a bomb, of means operated by contact with the target toward which the bomb is moving for exploding the bomb when it reaches a predetermined distance from the target irrespective of the time of flight of the bomb, and a controlling member adjustable in one direction to increase and in another direction to decrease the distance.

2. The combination with a bomb, of a weight adapted to travel in advance of the bomb, a filament connecting the weight with the bomb, means for retarding the movement of the bomb and thereby maintaining the filament taut, means becoming operative when the filament is slackened to explode the bomb, and a controlling member movable into different adjusted positions for varying the effective length of the filament and thereby controlling the distance between the moving bomb and weight.

3. The combination with a bomb, of a weight adapted to travel in advance of the bomb, a filament connecting the weight with the bomb, means for maintaining the filament taut after the bomb and weight have been launched on their flight, means becoming operative when the filament is slackened to explode the bomb, and a controlling member adjustable with respect to the filament and weight for varying the effective length of the filament and thereby the distance from the target at which the bomb will explode.

4. The combination with a bomb, of a weight adapted to travel in advance of the bomb, means for connecting the bomb and weight, said means including a filament and a reel upon one end of which the filament is wound, said reel being capable of rotary movement independently of the weight, and an adjustable stop member capable of being set before the bomb and weight are launched in their flight for arresting the rotation of the reel when any desired amount of the filament shall have been paid out.

5. The combination with a bomb, of a weight adapted to travel in advance of the bomb, a reel mounted on the weight and capable of bodily and rotative movement, a filament wound on the reel and attached to the bomb, a stop for limiting the bodily movement of the reel, and means whereby the stop may be adjusted to determine the extent of bodily movement of the reel.

6. The combination with a bomb, of a weight adapted to travel in advance of the bomb, means including a filament and a reel for connecting the bomb and the weight, means for retarding the paying out of the filament, and means whereby the force exerted by the retarding means may be varied.

7. The combination with a bomb, of an electric generator for furnishing current to explode the bomb, means operated by the travel of the bomb through the air for driving the generator, a circuit including contact points connecting the generator with the charge of explosive in the bomb, a weight adapted to travel in advance of the bomb and to hold the contact points in spaced relation and the circuit open, and means becoming effective when the movement of the weight is retarded to close the circuit.

8. The combination with a bomb, of an electric generator for furnishing current to explode the bomb, a propeller for driving the generator, means on the bomb for directing a current of air upon the propeller to rotate it, a circuit with which the generator is connected, means operating during the flight of the bomb to hold the circuit open until the bomb has reached a predetermined distance from the target irrespective of the time of flight of the bomb and thereafter to close the circuit and explode the bomb, and a controlling member movable into different adjusted positions before the bomb is launched on its flight to vary said distance as may be desired.

9. The combination with a bomb, of means for exploding it, means including a member which travels ahead of the bomb a selected distance for rendering the exploding means operative, and a controlling member readily accessible to manipulation by the operator and adjustable into different positions to predetermine and vary the distance.

10. The combination with a bomb, of a weight adapted to travel in advance of the bomb, a coil of filament mounted in one member and having its free end attached to the other, and a controlling member mounted on the same member with the coil and adjustable into different positions to determine and vary the amount of filament which will be unwound and thereby the position in advance of the bomb which the weight will assume.

11. The combination with a bomb, of a weight adapted to travel in advance of the bomb, means for connecting the bomb and weight, said means including a filament and a reel upon which one end of the filament is wound whereby the depending weight acts to unwind the filament from the reel, and an adjustable member adapted to be set in different positions by the operator independently of the filament and weight to stop the unwinding of the filament when a predetermined amount has been unwound.

12. The combination with a bomb, of a weight adapted to travel in advance of the bomb, a filament connecting the bomb and the weight, means including an adjustable controller for controlling the effective length of the filament to cause the explosion to take place either at a predetermined point near the target or at a predetermined point more remote from the target or at any intermediate point, and a scale with respect to which the controller moves whereby the operator is apprised when the desired adjustment has been made.

13. The combination with a bomb, of a member adapted to travel in advance of the bomb, means responsive to the retarding of the member for exploding the bomb, and means adapted to be moved into different positions and thereby set by the operator for causing the explosion to take place either at a predetermined point near the target or at a predetermined point remote from the target or at an intermediate point.

14. The combination with a bomb, of a weight adapted to travel in advance of the bomb and to explode the bomb by reason of its contact with the target, and means for varying the distance which the weight will assume from the bomb during its flight, said means including an adjustable member mounted for convenient manipulation by the operator prior to the releasing of the bomb while maintaining the relative position of the bomb and weight unchanged.

15. The combination with a bomb, of a weight adapted to travel in advance of the bomb, a coiled filament connecting the weight and the bomb and adapted to unwind when the bomb and weight are dropped, and means for varying the amount of filament which will be unwound while maintaining the relative positions of bomb, filament and weight unchanged.

In testimony whereof we have signed our names to this specification.

JOHN B. HADAWAY.
CHARLES E. CAMPBELL.